United States Patent [19]
Kim et al.

[11] Patent Number: 5,846,070
[45] Date of Patent: Dec. 8, 1998

[54] PARTY CANDLE HAVING VISUALLY COMMEMORATIVE EFFECT

[76] Inventors: Youngchoon Kim, Hae-Un park apt. 2-310, 986-5, Moonhyon 4 dong Nam-ku, Pusan; Sangkye Lee, Hyondae-green apt. 302-707, 1411-10, Banyo 1 dong Haeudae-ku, Pusan; Byongjoo Jung, Ildong-Daeyong apt. 106, 172, Yonji-dong, Jin-ku, Pusan; Yangsoo Lee, 2/1 1036, Keoje-dong, Yonje-ku, Pusan, all of Rep. of Korea

[21] Appl. No.: 934,987
[22] Filed: Sep. 22, 1997
[51] Int. Cl.$^6$ ..................................... F23D 3/02
[52] U.S. Cl. ........................ 431/253; 431/289; 362/86; 362/812; 362/276
[58] Field of Search ............................. 362/31, 276, 812, 362/800, 802, 228, 86; 84/2, 171; 431/288, 289, 300, 253

[56] References Cited

U.S. PATENT DOCUMENTS

| | | | |
|---|---|---|---|
| 3,762,857 | 10/1973 | Andeweg | 362/86 |
| 3,890,085 | 6/1975 | Aneweg | 431/289 |
| 3,968,584 | 7/1976 | Kingston | 362/812 |
| 4,568,269 | 2/1986 | Lin | 431/289 |
| 5,027,258 | 6/1991 | Schoniger et al. | 362/812 |

*Primary Examiner*—James C. Yeung
*Attorney, Agent, or Firm*—Notaro & Michalos P.C.

[57] ABSTRACT

A party candle having a visually commemorative effect according to the present invention including: a decoration plate which is comprised of a transparent plate having a concave groove, an operation device inserting groove and a switching plate passing groove. A light emitting diode is connected to first and second electric wires which is inserted at the left side ends of the concave groove. A rear plate covers the back of the decoration plate and; a leg portion which is bonded vertically to the bottom surface of the center portion of the decoration plate holds the device up. A candle portion which is comprised of a wick, a vinyl sheet formed on the center portion thereof, and a switching plate formed near the wick and comprised of first and second aluminum plates attached on the front and rear sides of the vinyl sheet; and an operation device which is comprised of a casing having an electric wire passing hole on the side surface thereof, a plurality of batteries installed in the casing, positive (+) and negative(−) terminals connecting positive electrodes and negative electrodes of the plurality of batteries, and a cover is in the device.

6 Claims, 4 Drawing Sheets

PARTY CANDLE HAVING VISUALLY COMMEMORATIVE EFFECT

BACKGROUND OF THE INVENTION

1. Field of the Invention

The present invention relates to a party candle having a visually commemorative effect.

2. Discussion of the Prior Art

Generally, when a variety of commemorative events or parties are held, the congratulating actions are made by fixing candles on a cake, lighting the candles and singing a celebrating song or giving a celebrated person a clap.

A general purpose candle which is decorated with colorful colors can be used or a melody candle into which a melody chip is installed and for generating a melody when a temperature of fire of the wick of the candle is sensed by the melody chip. However, in the commemorative events or parties with the general candle, there is needed only a simple action for lighting the candle, such that it is difficult to create an exciting atmosphere. Meanwhile, in the commemorative events or parties with the melody candle, the exciting atmosphere is produced by the melody from the candle, but only an aural pleasure from the melody is obtained.

SUMMARY OF THE INVENTION

An object of the present invention is to provide a party candle which can obtain a visually commemorative effect.

To achieve this and other objects according to the present invention, there is provided a party candle having a visually commemorative effect, including: a decoration plate which is comprised of a transparent plate having a concave groove on which a word or a phrase indicative of the contents of commemorating a variety of parties or events is formed on the front surface thereof, having an operation device inserting groove and a switching plate passing groove which are formed on the center portion of the rear surface thereof, and having a light emitting diode connected to first and second electric wires which is inserted at the left side ends of the concave groove, and a rear plate having an electric wire passing groove formed on the left side thereof; a leg portion which is bonded vertically to the bottom surface of the center portion of the decoration plate; a candle portion which is comprised of a wick, a vinyl sheet formed on the center portion thereof, and a switching plate formed near the wick and comprised of first and second aluminum plates attached on the front and rear sides of the vinyl sheet; and an operation device which is comprised of a casing having an electric wire passing hole on the side surface thereof, a plurality of batteries installed in the casing, positive (+) and negative (−) terminals connecting positive electrodes and negative electrodes of the plurality of batteries, and a cover formed by inserting the bottom end of the switching plate into the casing to solder the second aluminum plate to the positive terminal and by then connecting the first aluminum plate with the negative terminal by an electric wire on a melody chip or a voice melody chip installed within the casing to thereby connect the first and second electric wires which are connected to the light emitting diode to the first aluminum plate and the negative terminal through the electric wire passing groove and the electric wire passing hole of the casing, whereby the operation device is inserted between the transparent plate and the rear plate, and the bottom surface of the candle portion is attached to the upper surface of the decoration plate by means of an adhesive material, while bonding the transparent plate and the rear plate.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
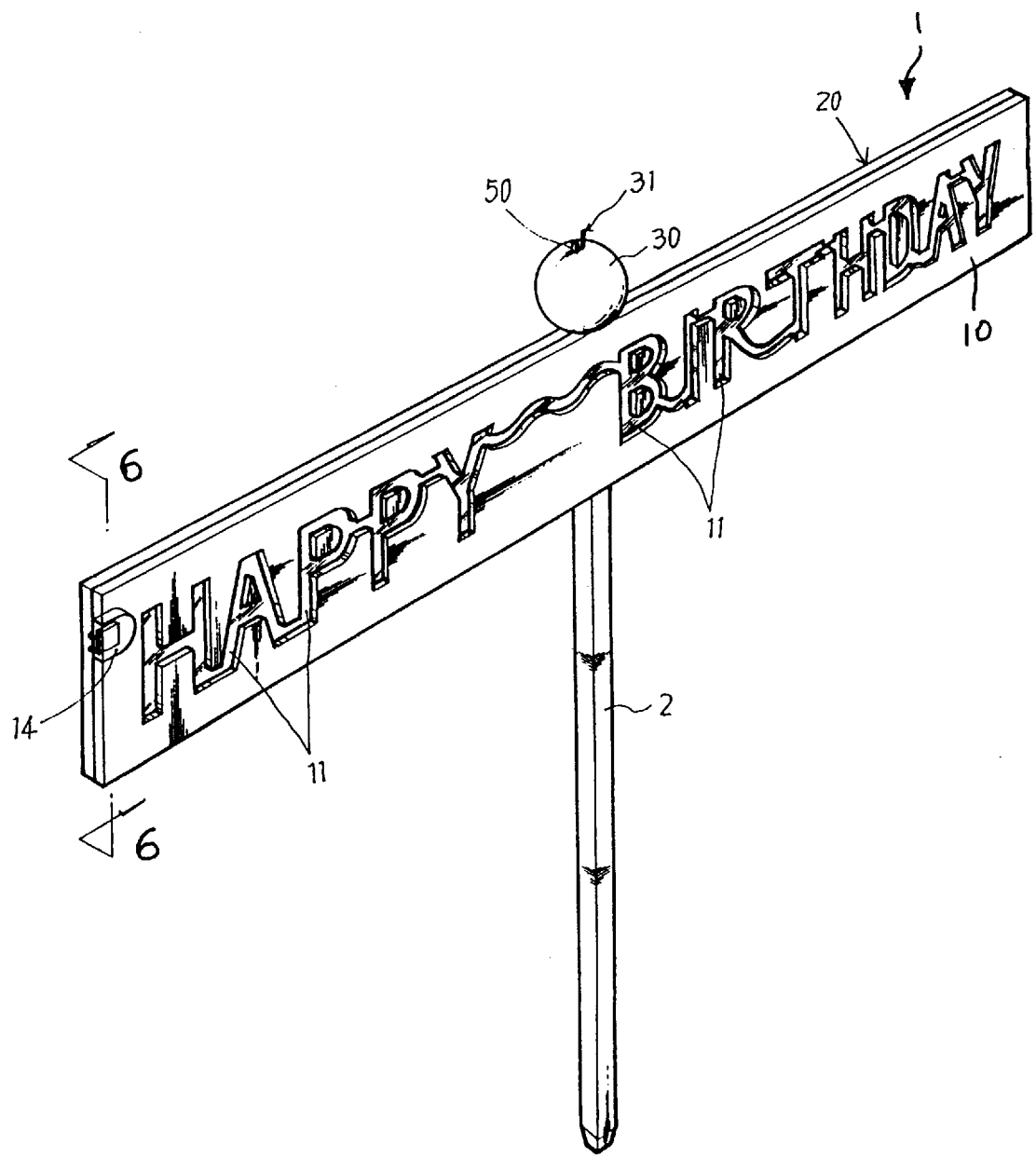
FIG. 1 is a perspective view illustrating a party candle having a visually commemorative effect according to the present invention.
Figure 2:
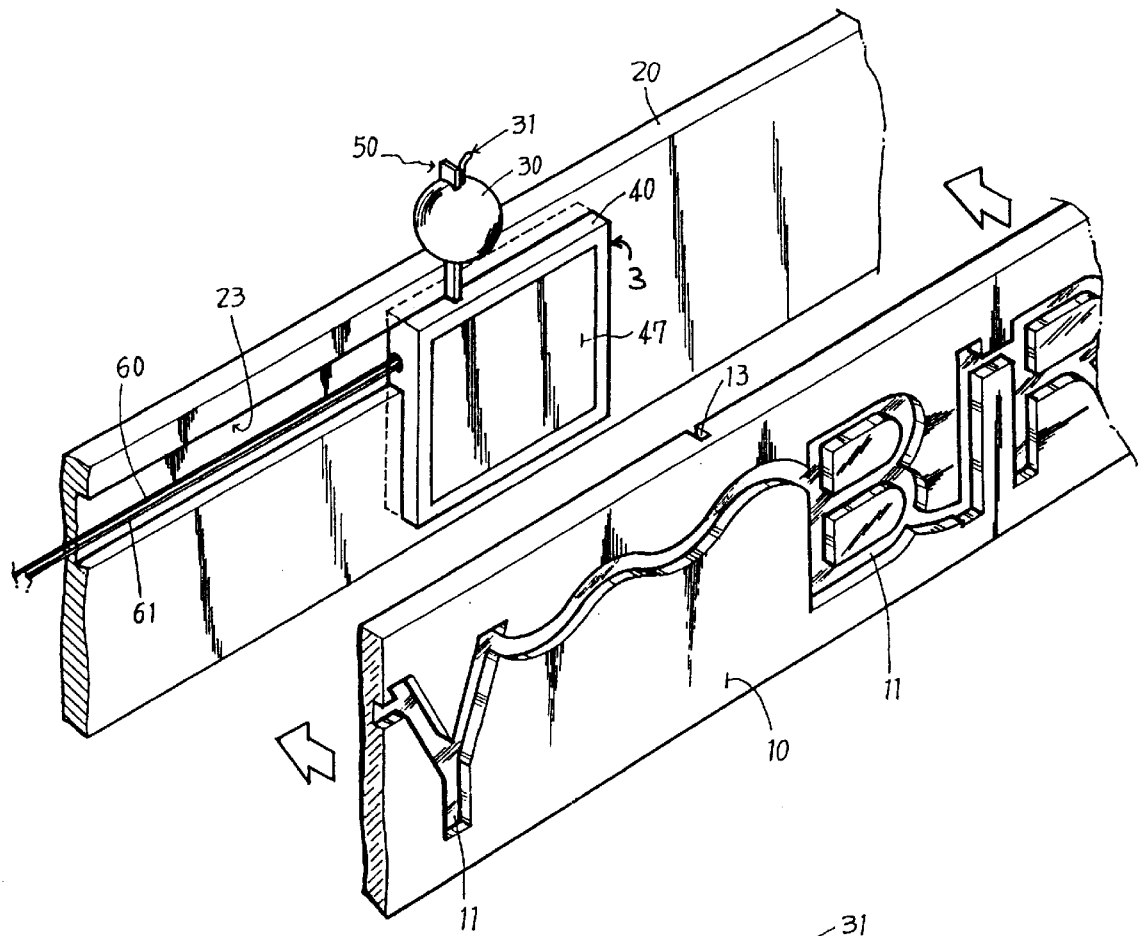
FIG. 2 is an exploded perspective view illustrating an internal structure of a party candle having a visually commemorative effect according to the present invention.
Figure 3:
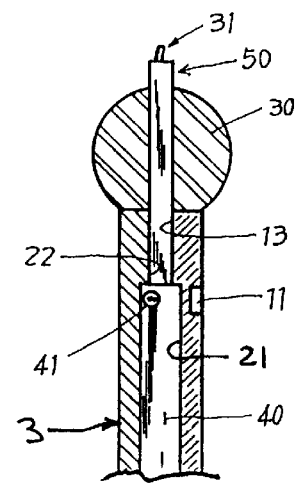
FIG. 3 is a vertical sectional view illustrating a center portion of a party candle having a visually commemorative effect according to the present invention.
Figure 4:
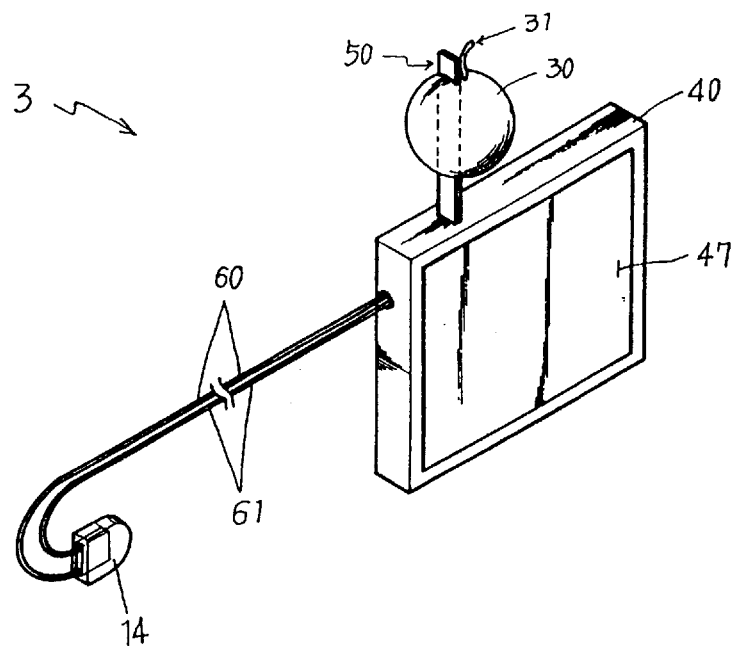
FIG. 4 is a perspective view illustrating an operation device of the party candle according to the present invention.
Figure 5:
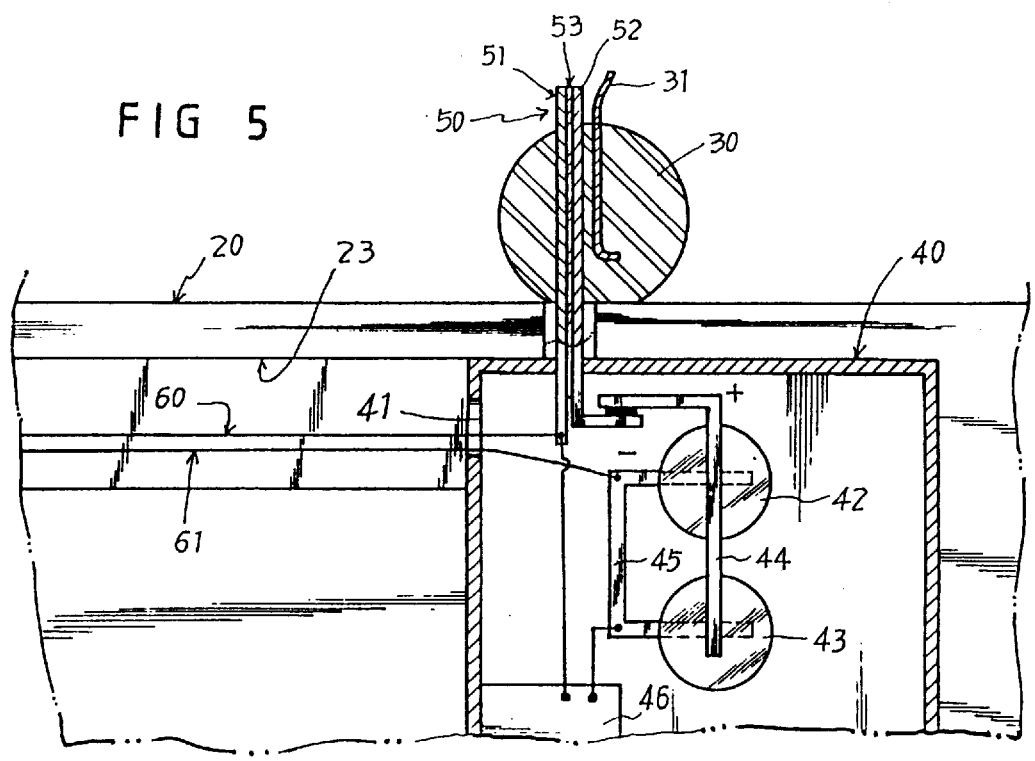
FIG. 5 is a sectional view illustrating an internal structure of the operation device of FIG. 4.
Figure 6:
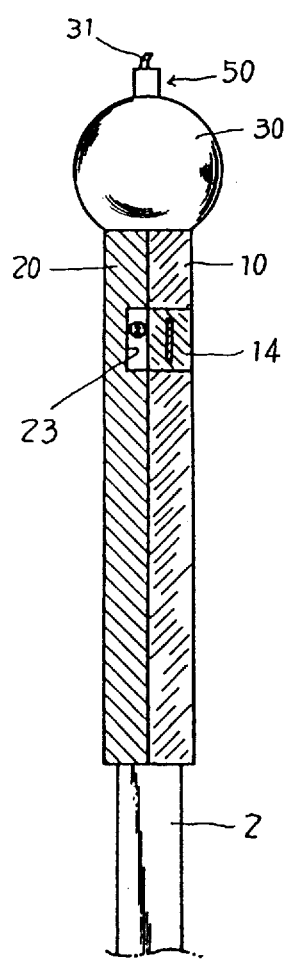
FIG. 6 is a sectional view taken along a line 6—6 of FIG. 1.

Hereinafter, an explanation on the construction and operational effect of a party candle assembly having a visually commemorative effect according to the present invention will be in detail discussed with reference to FIGS. 1 to 6.

Referring to FIGS. 1 to 6, there is provided a party candle assembly having a visually commemorative effect according to the present invention, including: a decoration plate 1 which is comprised of a transparent plate 10 having a concave groove 11 on which a word or a phrase indicative of the contents of commemorating a variety of parties or events is formed on the front surface thereof, having an operation device inserting groove 21 and a switching plate passing groove 22 which are formed on the center portion of the rear surface thereof. A light emitting diode 14 is connected to first and second electric wires 60 and 61 and is inserted at the left side end of the concave groove 11. A rear plate 20 having an electric wire passing groove 23 formed on the left side thereof covers the rear surface of plate 10. A leg portion 2 which is bonded vertically to the bottom surface of the center portion of the decoration plate 1 supports the plate. A candle portion 30 which is comprised of a wick 31, a vinyl sheet 53 formed on the center portion thereof, and a switching plate 50 is at the top of the plate. Switching plate 50 is near the wick 31 and is comprised of first and second aluminum plates 51 and 52 attached on the front and rear sides of the vinyl sheet 53. An operation device 3 which is comprised of a casing 40 having an electric wire passing hole 41 on the side surface thereof, a plurality of batteries 42 and 43 installed in the casing 40, positive (+) and negative (−) terminals 44 and 45 connecting positive electrodes and negative electrodes of the plurality of batteries 42 and 43, and a cover 47 is below candle 30. The bottom end of the switching plate 50 extends into the casing 40 through a switch plate groove 13 in the rear surface of plate 10. The second aluminum plate 52 is soldered to the positive terminal 44 and the first aluminum plate 51 is connected to the negative terminal 45 by an electric wire on a melody chip or a voice melody chip 46 installed within the casing 40 to thereby connect the first and second electric wires 60 and 61 which are connected to the light emitting diode 14 to the first aluminum plate 51 and the negative terminal 45 through the electric wire passing groove 23 and the electric wire passing hole 41 of the casing 40. The operation device 3 is inserted between the transparent plate 10 and the rear plate 20, and the bottom surface of the candle portion 30 is attached to the upper surface of the decoration plate 1 by means of an adhesive material, while bonding the transparent plate 10 and the rear plate 20.

Under the structure as mentioned above, if the wick 31 of the candle portion 30 is lighted, the vinyl sheet 53 of the switching plate 50 is melted by the temperature of the wick 31 and thereby the first and second aluminum plates 51 and 52 formed on the front and rear sides of the switching plate 50 come in contact with each other, thus to make the electric current of the plurality of batteries conductive. As a result, the melody or the voice memory chip or sound chip 46 is driven to ring melody or a voice message, and simultaneously, the light of the light emitting diode 14 is refracted to the interior of the transparent plate 10 and emits the pattern of the concave groove 11 on which a word or a phrase indicative of the contents of commemorating a variety of parties or events is formed, thus to exhibit a visually commemorative effect.

The transparent plate 10 embodied according to the present invention is preferably made of acrylic, plastic or synthetic resins, and may be replaced with a semitransparent plate, which desirably has dim, beautiful colors.

The concave groove 11 of the transparent plate 10 may be engraved by an engraving tool or may be formed at the same time when the transparent plate 10 is molded.

The rear plate 20 is preferably made of opaque acrylic, plastic or synthetic resins, and all kinds of pictures or photographs can be printed or attached on the inner surface thereof. The light emitting diode 14 is desirably selected among rainbow colors, but may be selected among colors having pastel tones. The candle 30 takes a form of a ball, square, triangle, star, half moon pattern and so on, or may be freely selected in petals, bread or sweets, animal's animated heads, robots, fruits and so on.

The first and second aluminum or metal plates 51 and 52 of the switching plate 50 may be replaced with another material which has high thermal conductivity and elongation, or may be replaced with two copper wires which are twisted between the vinyl sheet 53. The vinyl sheet 53 may be substituted for a synthetic resin or paraffin which is easily melted in the heat.

In the preferred embodiment of the present invention, the position of the light emitting diode 14 is fixed at the leftmost position of the transparent plate 10, but may be fixed on the center portion or the rightmost position of the transparent plate 10. Further, two or more light emitting diodes 14 having the same colors or different colors from each other may be used. If one light emitting diode 14 is positioned at the center portion of the transparent plate 10, the light of the light emitting diodes 14 is emitted from the center portion to the left and right directions. Meanwhile, if the light emitting diodes 14 are disposed at the leftmost and rightmost positions, respectively, the light of the light emitting diodes 14 is emitted from the left and right directions to the center portion. At the time, if the colors of the light emitting diodes 14 are different, the different colors are folded at the center portion of the transparent plate 10 to thereby exhibit a fantastic atmosphere.

The word or phrase on the concave groove 11 is preferably displayed by the country language in which the candle according to the present invention is used, but may be displayed with various kinds of styles or designs. Moreover, the decoration plate 1 takes a form of a round, regular square, star, half moon, or other geometrical shape, or may be freely selected in the human body's shape, animal's shape, or flower's shape. The melody or the voice message stored in the melody or the voice memory chip 46 should be satisfied with the characteristics of the events or parties. As a typical circuit technique is applied within the casing 40, the light emitting diode 14 is designed to be intermittently emitted by each one seconds, two seconds or three seconds.

In this case, the light of the light emitting diode 14 is transmitted in a repeated manner along the concave groove 11, as if it rises and falls like waves.

As clearly apparent from the above, in a party candle having a visually commemorative effect according to the present invention, when the candle is lighted, the vinyl sheet of the switching plate is melt by the temperature of the candle and thereby the first and second aluminum plates of the switching plate become in contact with each other, to thereby make the electric current of the plurality of batteries conductive. As a result, the melody chip or the voice memory chip is driven to ring melody or a voice message which is satisfied with the characteristics of a variety of events or parties, and simultaneously, the light of the light emitting diode is transmitted along the pattern of the concave groove on which a word or a phrase indicative of the contents of commemorating the variety of parties or events is formed, thus to exhibit a visually commemorative effect and to achieve a greatly exiting atmosphere.

Although a preferred form of the invention has been described, it will be understood by those skilled in the field that variations therefrom, and analogous uses, are within the knowledge of those skilled in the art. Accordingly, it is intended that the scope of the invention be defined, not by the scope of the foregoing description, but rather by the scope of the claims as interpreted in view of the pertinent prior art.

What is claimed is:

1. A party candle assembly having a visually commemorative effect and an audible effect, comprising:

a decorative plate having a front surface and a rear surface, a concave groove in the form of commemorative indicia on the front surface, an operating device groove and a switching plate groove in the rear surface;

a light emitting diode connected to the decorative plate adjacent the concave groove for shedding light into the concave groove;

a rear plate having a front surface attached to the rear surface of the decorative plate, the rear plate containing an electric wire groove;

a leg connected to a bottom surface of at least one of the plates for supporting the decorative and rear plates;

a candle at a top surface of the decorative and rear plates, said candle including a wick;

a switching plate extending through said candle, said switching plate having an upper end which is adjacent said wick and a lower end extending through said switching plate groove and into said operating device groove, said switching plate comprising first and second metal plates and a meltable sheet between said first and second metal plates for separating said first and second metal plates from each other, said meltable sheet being meltable at said upper end of said switching plate due to heat from said wick when said wick is burning, to establish electrical connection between said first and second plates at said upper end of said switching plate;

an operating device in said operating device groove, the lower end of said switching plate being connected to said operating device and a pair of wires connected between said light emitting diode and said operating device;

said operating device comprising a casing having a wire passing hole for receiving said pair of wires, a plurality of batteries in said casing, a positive terminal in said casing connected to positive ends of said batteries, a negative terminal in said casing connected to negative ends of said batteries, a cover for closing said casing, said first metal plate of said switching plate being soldered to one of said positive and negative terminals;

said operating device including a sound chip in said casing, one of said wires from said light emitting diode being connected to one of said positive and negative terminals and the other of said wires from said light emitting diode being connected to said second metal plate of said switching plate, said sound chip including a pair or terminals electrically connected between said other of said positive and negative terminals and said second metal plate of said switching plate so that when said wick burns to melt said sheet, the upper ends of said first and second metal plates electrically connect to each other to supply electricity from said positive and negative terminals to said chip for causing said chip to produce sound and to said light emitting diode for closing said light emitting diode to emit light.

2. An assembly according to claim 1 wherein said first and second plates comprise aluminum plates.

3. An assembly according to claim 1 wherein said sheet comprises a vinyl sheet.

4. An assembly according to claim 3 wherein said metal plates comprise aluminum plates.

5. An assembly according to claim 1 wherein said decorative plate is transparent and said rear plate is opaque.

6. An assembly according to claim 5 wherein said metal plates are aluminum and said sheet is a vinyl sheet.

* * * * *